C. H. JUDSON.
MILKING MACHINE.
APPLICATION FILED AUG. 1, 1912.

1,060,261.

Patented Apr. 29, 1913.

3 SHEETS—SHEET 1.

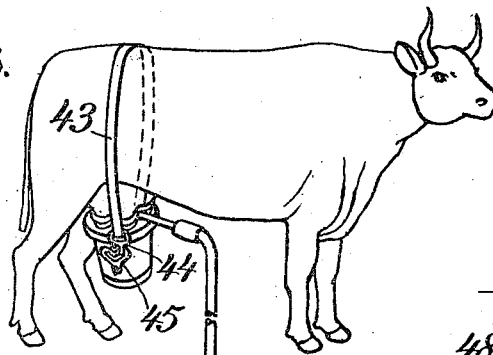
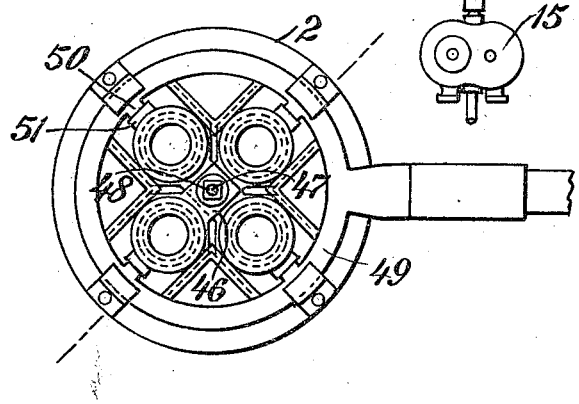
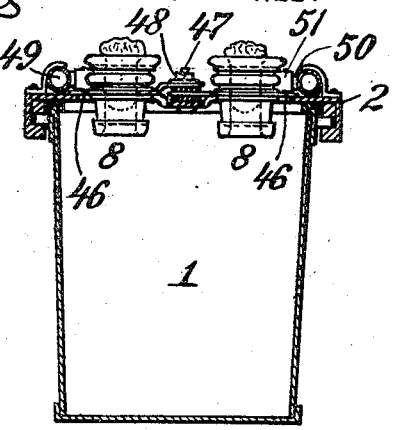
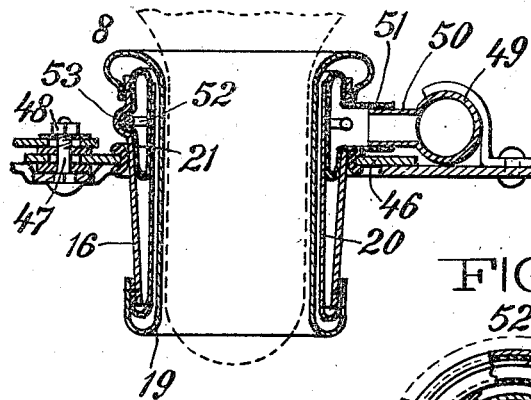
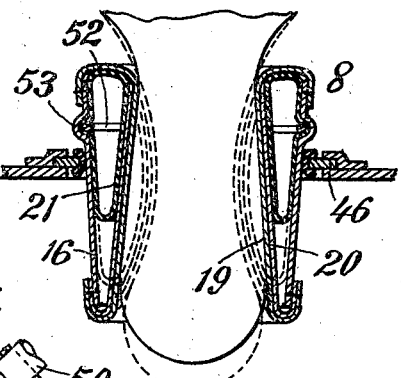
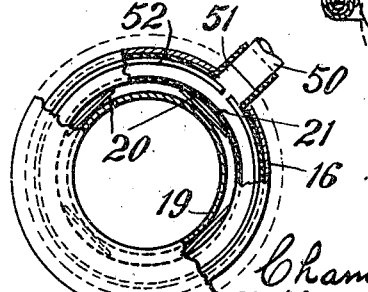

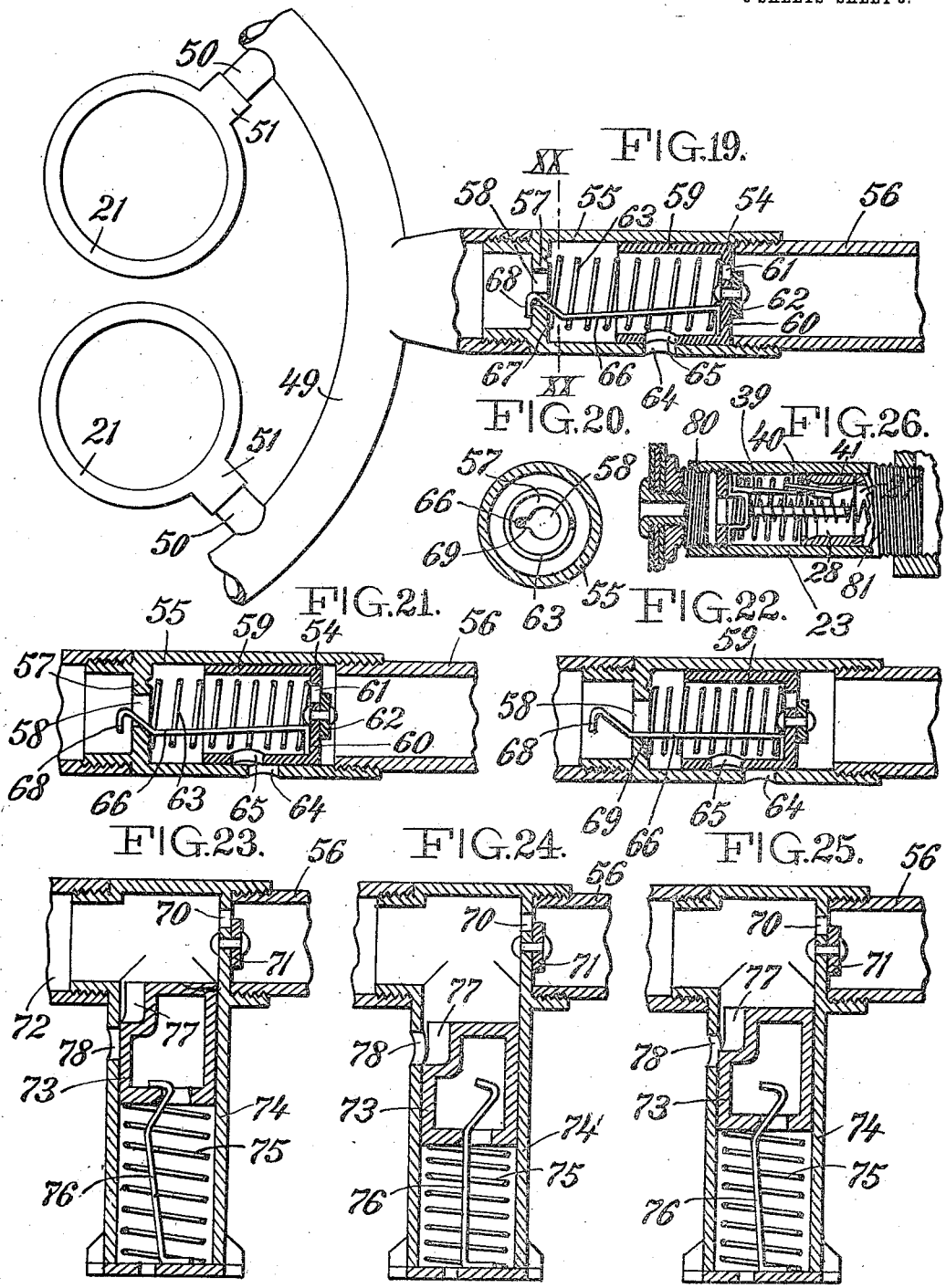

UNITED STATES PATENT OFFICE.

CHAMPION H. JUDSON, OF DOBBS FERRY, NEW YORK.

MILKING-MACHINE.

1,060,261.  Specification of Letters Patent.  Patented Apr. 29, 1913.

Application filed August 1, 1912. Serial No. 712,674.

*To all whom it may concern:*

Be it known that I, CHAMPION H. JUDSON, a citizen of the United States, residing in the city of Dobbs Ferry, county of Westchester, and State of New York, have invented certain new and useful Improvements in Milking-Machines, of which the following is a specification.

My invention relates to mechanical milking machines and actuating devices for use in connection therewith.

My design has been to produce a machine which shall approximate as closely as possible the effect of hand-milking, but which shall be power actuated and automatic. My device is of the pneumatic pressure-operated type, in which the pressure of the air never falls below atmospheric, the functioning of the machine being caused by an automatic valve which causes pulsations of pressure in the milking apparatus.

My invention resides not only in the novel milking device, but also in the valve mechanism for operating it.

In the accompanying drawings which form a part of this specification, Figure 1 is a top view of a complete milking apparatus; Fig. 2 is a transverse sectional view through Fig. 1; Fig. 3 is a fragmentary sectional view showing bayonet joint means for locking the cover carrying the milking device to the milk pail; Fig. 4 is a transverse sectional view of the milking device and its associated parts; Fig. 5 is a similar fragmentary view showing the effect of introducing air pressure; Fig. 6 is a top view of Fig. 4, parts being broken away; Figs. 7, 8, 9, 10 and 11 are longitudinal sectional views of my improved valve structure in successive positions during a cycle of operations; Fig. 12 is a transverse sectional view on line XII—XII of Fig. 7; Fig. 13 illustrates the machine attached in position ready for use; Fig. 14 is a view similar to Fig. 1, showing a modification; Fig. 15 is a transverse sectional view of Fig. 14; Fig. 16 is a transverse sectional view of a modified form of the milking device; Fig. 17 is a similar view showing successive positions of the parts produced by introduction of air pressure; Fig. 18 is a top view of Fig. 16, parts being broken away; Fig. 19 is a longitudinal sectional view of a further modification of the valve structure; Fig. 20 is a transverse sectional view of the same on line XX—XX of Fig. 19; Figs. 21 and 22 show successive positions of the same structure; Figs. 23, 24 and 25 illustrate a further modification of the valve in its successive positions, and Fig. 26 is a view similar to Fig. 7 showing a modification.

Referring to the drawings in detail, the numeral 1 designates a milk pail having a cover 2 secured thereto by means of a bayonet joint comprising the pins 3 secured to the pail entering slots 4 in the flange 5 of the cover. A rubber washer or gasket 6 insures a tightly sealed joint between the cover and pail. Mounted in a frame 7 affixed to the cover are four milking units or teat cups 8 mounted on slides 9, the sides of which engage the slots in the frame 7 and are guided thereby in close contact with the top of the cover, which is pierced with a corresponding plurality of holes 10, each of which is sufficiently larger than the milking unit to provide for adjustment, the slides 9 being of such size that they always completely cover these openings no matter in what position the milking unit may be. Connecting each unit with a central air box 11 is a valve 12 having one end threaded at 13 to enter a correspondingly threaded opening in the air box. Adjustment is provided by altering the relative positions of these threaded parts, so that the milking unit is forced closer to or farther away from the air box. The holes for the reception of the threaded portions of the valves are offset from the center lines of the air box, as shown in Fig. 1, so that a maximum degree of adjustment may be obtained without interference of one unit with an adjacent unit. A pipe 14 leads from the central air box to any suitable source of air pressure 15. Each milking unit consists of a conical or slightly tapered ring 16 of substantially non-elastic material, such for instance as aluminum. Secured to the top of this ring at 17, and at the bottom at 18, and looped about it, is a shield member 19 of soft pliable material, such as cloth fabric, which normally has substantially the configuration shown in Fig. 14. Between this shield and the ring is a set of four strips 20 of elastic but rigid material, such as celluloid. Each strip is secured to the outer ring at 18. These strips act to guide and limit the constricting effect of the extensible air chamber, as will be apparent from the drawings and the description of the operation of the device found below. In the annular space between the ring and strips is an extensible air chamber 21 preferably formed of rubber and normally assuming the position shown in Fig. 4. This air chamber is annular in form and fits snugly between the ring and strips. It is air tight but communicates with the valve 12 through the nipple 22, this joint being also necessarily air-tight.

When air pressure is introduced into the air chamber through the valve 12, the parts will tend to assume the position shown in Fig. 5. The air chamber is distended, and as expansion outwardly is prevented by the outer ring 16, its extension must be either vertical or radially inward. As the pressure begins to rise the chamber exerts an inward pressure at the upper part of the unit, acting upon the upper part of the four strips and the shield with a constricting effect, which is progressive in a downward direction until the maximum extension is reached, shown substantially in Fig. 5. As successive pulsations of pressure occur, this cycle of events will be repeated at regular intervals and a smooth and steady milking action will result which closely approximates the effect of hand-milking, owing to the downward progress of the constriction of the ring.

Referring now particularly to Figs. 7, 8, 9, 10, 11 and 12, the construction and operation of the valve mechanism will be described: The valve comprises a barrel or cylinder 23, one end, as already described, being externally threaded at 13. The opposite end is internally threaded at 24 to receive a fixed head 25 through which passes the hole 26 communicating with the air chamber in the milking unit. Within the cylinder are two hollow pistons, a primary piston 27 and a secondary piston 28, both of which fit closely within the cylinder walls. The primary piston has a head 29, but the secondary piston is open at both ends, being in effect merely a ring. The end of the cylinder is slightly offset at 30 to prevent the primary piston from leaving the cylinder at that end. The head 29 is tapped with a hole 31 and a valve 32 pivoted to the head at 33 controls the effective size of this opening. A spring 34 is supported upon the stationary pin 35 affixed to a skeleton frame 36, which in turn is secured to the head 25. One end of this spring bears against the inner wall of the head 29, and normally forces the primary piston into the extreme right-hand position shown in Fig. 7. A second spring 37 surrounds the first and bears against the rim of the secondary piston, and thereby forces this piston also to its extreme right-hand position, that shown in Fig. 7. The spring 37 has a contributing effect toward forcing the primary piston into its extreme position.

The operation of the device is as follows:

Air pressure applied at the right-hand end of the valve member will force the two pistons to the left until they arrive in the position where a state of balance is reached between the pressure of the air and the opposing pressure of the two springs. When this position is reached the wall of the secondary piston has closed an opening 38 in the cylinder wall, so that the only outlet for the air which enters the interior of the valve through the opening 31 is the passage 26 leading into the extensible air chamber. The parts will now remain stationary in the position of Fig. 8 for an interval while the pressure builds up in the parts communicating with the interior of the valve, owing to the leakage of the air through the opening 31. Eventually a condition will arise where the air and spring pressures become so nearly balanced that the springs will again take effect and the two pistons will progress together to the right for a short distance. At this stage the further return of the secondary piston is prevented by means of a latch mounted on the end of a stationary spring arm 39, to the end of which is secured a spring comprising two arms 40 and 41 bent at a slight angle to each other said spring latch being adapted to tilt with respect to the spring arm. The end of the arm 40 is forced into and engages a groove 42 in the extreme left-hand end of the secondary piston, thus momentarily checking its progress, but permitting the primary piston to continue its travel to the right as shown in Fig. 10, the right-hand end of the arm 41 meanwhile bearing against the inner wall of the primary piston and aiding the resiliency of the latch structure to keep the arm 40 in engagement with the groove of the secondary piston. During this operation it will be noted that the outlet passage 38 is still closed by the secondary piston and that therefore there is no outlet for the air which enters the valve through the passage 31, and that the pressure is constantly rising, with a tendency to reach the maximum limit fixed by the pressure in the supply pipe 14. As the pressure continues to rise within the valve and its associated parts, the spring 34 will continue to act with greater and greater effect, finally forcing the primary piston into the position shown in Fig. 11. When this stage is reached the end of the arm 41 of the latch will be forced into the space between the two pistons as shown in Fig. 11 and the arm 40 will therefore tilt downward and release the secondary piston, which will immediately be forced to the right by the action of the spring 37. This will suddenly open the exhaust port and permit the pressure within the valve and the milking device to drop, resulting in a collapse of the resilient parts of the milking device and a return of them to the condition which originally existed. With the parts in the position shown in Fig. 11 it will be noted that the spring arm 41 prevents the untimely return to the left of the primary piston. This ends the cycle of operations, and the pressure will once more force the pistons to the left and slowly begin to build up within the valve and its connecting parts as already described, this operation being repeated at regular and definite intervals, which time element is dependent upon the size of the openings 31 and 38 and the force of the two springs.

In Fig. 13 I have shown means for attaching the device to the cow, comprising a belt or strap 43 carrying at its extremities hooks 44 engaging the slotted members 45 secured to the exterior of the milk pail.

In Figs. 14 and 15 I have shown a modification in the adjusting device for the individual milking units with respect to each other and the cover of the pail. In this case each of the units is secured to a slotted bar 46 through which passes a central bolt 47, an adjusting nut or clamp 48 being provided for locking the units in proper position after they have been adjusted in place. In order to permit this form of adjustment I further modify the connection between the individual units and the supply pipe which is shown in detail in Figs. 16, 17 and 18. In this type the supply pipe has the form of a ring 49 in communication with the valve structure. From this ring branch radially disposed service pipes 50 upon each of which is slidably mounted a resilient union 51 forming an air-tight joint therewith but permitting each unit to be adjusted as above described in a radial direction with relation to the ring. The milking unit is essentially the same in this type, with the exception that the expansible air chamber is secured in place by means of a spring ring 52 which forces a portion of this chamber into an annular groove 53 in the wall of the outside ring. The operation of the device, successive positions of which are shown in Fig. 17, is not affected by this change.

In Figs. 19 to 25 inclusive are illustrated further modifications of the valve which are adapted to be used with either type of milking unit and adjusting mechanism hitherto described. This valve structure comprises a piston 54 sliding within the chamber formed by the cylinder 55 mounted upon the supply pipe 56 and having a head 57 through which is a passage 58 in communication with the milking device. The piston comprises a ring 59 closely fitting within the cylinder, and a head 60 mounted upon the ring adjacent to the supply pipe. Through this head is a passage 61 whose effective opening is controlled by means of a flap valve 62. A spring 63 tends to force the piston toward the supply pipe into the position shown in Fig. 19, where the piston engages the end of the supply pipe and its movement to the right is limited thereby. The cylinder is provided with an exhaust port 64 with which registers a similar port 65 in the ring of the piston when the latter is in its extreme right-hand position. A resilient spring arm 66 is firmly secured at one end to the head of the piston and slopes away from the same and radially outward with respect to the cylinder, as shown in Fig. 19, the end of the arm being sharply inclined inwardly at 67 and carrying at its extremity a hook 68 which engages the wall 57 when the piston is in its extreme right-hand position. The arm is received within a slot 69 in the wall 57. The operation of this device is as follows: Upon air pressure being supplied through the supply pipe 56, the piston will be forced into its extreme left-hand position, the inclined end of the spring arm rising within the slot 69. As a result of the progress of the piston within the cylinder, the exhaust ports will no longer register and all communication from the interior of the valve and its associated parts will be cut off except through the passage 61. This will result in a gradual rise of the pressure within the valve and its parts, including the milking devices, until eventually a state of balance arises just as in the forms already described, so that the spring 63 has an opportunity to act against the pressure and again force the piston toward its right-hand position. Through a considerable portion of this travel the spring arm will have no effect, merely bearing in a horizontal position upon the wall of its groove as shown in Fig. 22. When, however, the piston gets near to its extreme position adjacent to the supply pipe, such that the ports begin to register and a slight exhaust opening is afforded, the pressure acting upon the interior of the piston head 54 will suddenly drop and the state of balance be so reduced that the piston will not act to return to the extreme end of its travel unless some auxiliary means are employed. These means exist in the form of the upturned end 67 of the spring arm, which at this juncture presses down upon the wall of the groove in which the arm slides and furnishes a strong component acting to force the piston to the right and causing it, with the aid of the spring 63 to return with a snap to the right-hand end of its travel. This cycle will be repeated indefinitely with the same effect upon the milking device as that produced by the form already described.

Figs. 23, 24 and 25 show a modification of this last type in which the air from the supply pipe 56 passes through a passage 70 controlled by flap valve 71 and directly into the pipe 72 leading to the milking device, causing a gradual increase in pressure therein. This increase, however, acts upon the piston 73 slidably mounted within the cylinder 74 which is angularly offset from the supply and distributing pipes, and causes the piston to be forced downward into the offset pipe against the force of the spring 75 and the spring arm 76, which in function and mode of operation correspond identically with the similar parts in the modification shown in Figs. 19 to 22 inclusive, with the exception that the spring arm is stationary and its groove a part of the piston instead of vice-versa. As the pressure mounts within the valve and the distributing system, the piston will reach a point such that the exhaust port 77 will register with the port 78 in the wall of its cylinder, affording a passage to the open air, so that the pressure within the distributing system will immediately fall substantially to atmospheric. The detailed operations with this type will be obvious from the description of the preceding types, the spring arm having the same auxiliary effect as in the preceding forms.

In Fig. 26 I have shown a modification of the valve structure first described which differs from the preceding only in the manner in which it affords adjustment of the milking units with respect to the distributing pipe. In this form the barrel or cylinder 23 is provided with internal right and left-hand threads which engage the threads 80 and 81 upon the opposite cylinder heads, thus forming a turn-buckle, so that by rotation of the barrel 23 the distance between the milking unit and the supply pipe may be varied at will without removing the unit from the pail.

While I have illustrated and described only a few specific embodiments of my invention, I appreciate the latter is susceptible of wide variation, and I do not wish to be limited to the precise structure shown and described.

Having thus described my invention, I claim:

1. In a milking device, a teat encircling member having a pliable inner ring, a rigid outer ring, substantially concentric therewith, a resilient strip secured near one extremity between said rings, and expansible fluid pressure operated means interposed between said strip and outer ring.

2. In a milking device, a teat encircling member having a pliable inner ring, a rigid outer ring substantially concentric therewith, a pair of oppositely disposed resilient strips secured near one extremity between said rings and expansible fluid pressure operated means interposed between said strips and outer ring.

3. In a milking device, a teat encircling member having a pliable inner ring, a rigid outer ring, two pairs of symmetrically disposed resilient strips secured near one extremity between said rings and expansible fluid pressure operated means interposed between said strip and outer ring.

4. A fluid pressure controlling means for milking machines, including means for introducing pressure gradually into a milking unit, and means controlled by the consequent rise in pressure within said unit for releasing said pressure when a desired maximum is reached.

5. A fluid pressure controlling means for milking machines, including means for introducing pressure gradually into a milking unit, means initially operated by said pressure for storing energy in opposition thereto and means for releasing the pressure within the unit at a faster rate than that of admission, said means being operated by said stored energy when an approximate state of balance between the internal and external pressures is reached.

6. A fluid pressure controlling means for milking machines, including means for introducing pressure gradually into a milking unit, means initially operated by said pressure for storing energy in opposition thereto, means tending to release the pressure within said unit at a faster rate than that of admission, and auxiliary means for completing the cycle of operation of said parts, said releasing and auxiliary means being operated by said stored energy when an approximate state of balance between the internal and external pressures is reached.

7. A fluid pressure controlling means for milking machines, including a cylinder adapted to communicate with a milking unit and a source of fluid pressure, a piston adapted to reciprocate within said cylinder and having a constricted passage affording communication between the source of pressure and the milking device, yieldable means opposing the travel of said piston when urged by said pressure, and an exhaust port for the milking unit in said cylinder normally open but adapted to be closed by said piston when the latter is forced by said external pressure against said yieldable means.

8. A fluid pressure controlling means for milking machines, including a cylinder adapted to communicate with a milking unit and a source of fluid pressure, a piston adapted to reciprocate within said cylinder and having a constricted passage affording communication between the source of pressure and the milking device, yieldable means opposing the travel of said piston when urged by said pressure, and an exhaust port for the milking unit in said cylinder normally affording communication between said milking unit and the atmosphere and adapted to be closed by said piston when the latter is forced against the action of said yieldable means by said external pressure, said yieldable means acting to cause the return of said piston to its initial position when an approximate state of balance is reached between the internal and external pressures and thereby open said exhaust port.

9. A fluid pressure controlling means for milking machines, including a cylinder adapted to communicate with a milking unit and a source of fluid pressure, a piston adapted to reciprocate within said cylinder and having a constricted passage affording communication between the source of pressure and the milking device, yieldable means opposing the travel of said piston when urged by said pressure, an exhaust port for the milking unit in said cylinder normally affording communication between said milking unit and the atmosphere and adapted to be closed by said piston when the latter is forced against the action of said yieldable means by said external pressure, said yieldable means tending to cause the return of said piston to its initial position when an approximate state of balance is reached between the internal and external pressures and thereby open said exhaust port, and auxiliary means for completing the functioning of said piston.

10. A fluid pressure controlling means for milking machines, including a cylinder adapted to communicate with a milking unit and a source of fluid pressure, a primary piston adapted to reciprocate within said cylinder and having a constricted passage longitudinally therethrough, a secondary piston within said cylinder interposed between said primary piston and said milking unit and having a passage longitudinally therethrough, an exhaust port for the milking unit in said cylinder normally open, adapted to be closed by the movement of said secondary piston toward said unit, yieldable means opposing the travel of said primary piston in the direction of said unit and yieldable means for opposing the travel of said secondary piston in the same direction.

11. A fluid pressure controlling means for milking machines, including a cylinder adapted to communicate with a milking unit and a source of fluid pressure, a primary piston adapted to reciprocate within said cylinder and having a constricted passage longitudinally therethrough, a secondary piston within said cylinder interposed between said primary piston and said milking unit and having a passage longitudinally therethrough, an exhaust port for the milking unit in said cylinder normally open, adapted to be closed by the movement of said secondary piston toward said unit, yieldable means opposing the travel of said primary piston in the direction of said unit, yieldable means for opposing the travel of said secondary piston in the same direction and means for delaying the travel of said secondary piston away from said unit.

12. A fluid pressure controlling means for milking machines, including a cylinder adapted to communicate with a milking unit and a source of fluid pressure, a primary piston adapted to reciprocate within said cylinder and having a contricted passage longitudinally therethrough, a secondary piston within said cylinder interposed between said primary piston and said milking unit and having a passage longitudinally therethrough, an exhaust port for the milking unit in said cylinder normally open, adapted to be closed by the movement of said secondary piston toward said unit, yieldable means opposing the travel of said primary piston in the direction of said unit, yieldable means for opposing the travel of said secondary piston in the same direction and means for delaying the travel of said secondary piston away from said unit until the primary piston has reached a definite point in its travel.

13. A fluid pressure controlling means for milking machines, including a cylinder adapted to communicate with a milking unit and a source of fluid pressure, a primary piston adapted to reciprocate within said cylinder and having a constricted passage longitudinally therethrough, a secondary piston within said cylinder interposed between said primary piston and said milking unit and having a passage longitudinally therethrough, an exhaust port for the milking unit in said cylinder normally open, adapted to be closed by the movement of said secondary piston toward said unit, yieldable means opposing the travel of said primary piston in the direction of said unit, yieldable means for opposing the travel of said secondary piston in the same direction and means for delaying the travel of said secondary piston away from said unit until the primary piston has reached a definite point in its travel, said secondary piston while thus delayed acting to close said exhaust port.

14. A fluid pressure controlling means for milking machines, including a cylinder adapted to communicate with a milking unit and a source of fluid pressure, a primary piston adapted to reciprocate within said cylinder and having a constricted passage longitudinally therethrough, a secondary piston within said cylinder interposed between said primary piston and said milking unit and having a passage longitudinally therethrough, an exhaust port for the milking unit in said cylinder normally open, adapted to be closed by the movement of said secondary piston toward said unit, yieldable means opposing the travel of said primary piston in the direction of said unit, yieldable means for opposing the travel of said secondary piston in the same direction and means for delaying the travel of said secondary piston away from said unit, said delaying means acting also to hold said primary piston in fixed position after the release of the secondary piston.

15. A fluid pressure controlling means for milking machines, including a cylinder adapted to communicate with a milking unit and a source of fluid pressure, a primary piston adapted to reciprocate within said cylinder and having a constricted passage longitudinally therethrough, a secondary piston within said cylinder interposed between said primary piston and said milking unit and having a passage longitudinally therethrough, an exhaust port for the milking unit in said cylinder normally open, adapted to be closed by the movement of said secondary piston toward said unit, yieldable means opposing the travel of said primary piston in the direction of said unit, yieldable means for opposing the travel of said secondary piston in the same direction, and a latch for holding said secondary piston in fixed position to cover said exhaust port until the primary piston has reached a definite stage in its travel.

16. A fluid pressure controlling means for milking machines, including a cylinder adapted to communicate with a milking unit and a source of fluid pressure, a primary piston adapted to reciprocate within said cylinder and having a constricted passage longitudinally therethrough, a secondary piston within said cylinder interposed between said primary piston and said milking unit and having a passage longitudinally therethrough, an exhaust port for the milking unit in said cylinder normally open, adapted to be closed by the movement of said secondary piston toward said unit, yieldable means opposing the travel of said primary piston in the direction of said unit, yieldable means for opposing the travel of said secondary piston in the same direction and a tilting spring latch for engaging the secondary piston and holding the same in fixed position to cover said exhaust port until the primary piston has reached a definite stage in its travel.

17. A fluid pressure controlling means for milking machines, including a cylinder adapted to communicate with a milking unit and a source of fluid pressure, a primary piston adapted to reciprocate within said cylinder and having a constricted passage longitudinally therethrough, a secondary piston within said cylinder interposed between said primary piston and said milking unit and having a passage longitudinally therethrough, an exhaust port for the milking unit in said cylinder normally open, adapted to be closed by the movement of said secondary piston toward said unit, yieldable means opposing the travel of said primary piston in the direction of said unit, yieldable means for opposing the travel of said secondary piston in the same direction, and a tilting spring latch for engaging the secondary piston and holding the same in fixed position to cover the exhaust port until the primary piston has reached a definite stage in its travel, then adapted to engage said primary piston and lock the same in fixed position until the exhaust port is opened by the further travel of the secondary piston.

18. A fluid pressure controlling means for milking machines, including a cylinder adapted to communicate with a milking unit and a source of fluid pressure, a primary piston adapted to reciprocate within said cylinder and having a constricted passage longitudinally therethrough, a secondary piston within said cylinder interposed between said primary piston and said milking unit and having a passage longitudinally therethrough, an exhaust port for the milking unit in said cylinder normally open, adapted to be closed by the movement of said secondary piston toward said unit, yieldable means opposing the travel of said primary piston in the direction of said unit, yieldable means for opposing the travel of said secondary piston in the same direction, and a tilting spring latch comprising an arm fixed to a stationary portion of said device and having mounted upon its free extremity angularly disposed arms adapted to tilt about the free end of said arm and lock the secondary piston in fixed position to cover the exhaust port until the primary piston has reached a definite stage in its travel.

19. A fluid pressure controlling means for milking machines, including a cylinder adapted to communicate with a milking unit and a source of fluid pressure, a primary piston adapted to reciprocate within said cylinder and having a constricted passage longitudinally therethrough, a secondary piston within said cylinder interposed between said primary piston and said milking unit and having a passage longitudinally therethrough, an exhaust port for the milking unit in said cylinder normally open, adapted to be closed by the movement of said secondary piston toward said unit, yieldable means opposing the travel of said primary piston in the direction of said unit, yieldable means for opposing the travel of said secondary piston in the same direction, and a tilting spring latch comprising an arm fixed to a stationary portion of said device and having mounted upon its free extremity angularly disposed arms adapted to tilt about the free end of said arm and lock the secondary piston in fixed position to cover the exhaust port until the primary piston has reached a definite stage in its travel, and to lock the primary piston in fixed position at that stage until the secondary piston opens the exhaust port.

20. A fluid pressure controlling means for milking machines, including a cylinder adapted to communicate with a milking unit and a source of fluid pressure, a primary piston adapted to reciprocate within said cylinder and having a constricted passage longitudinally therethrough, a secondary piston within said cylinder interposed between said primary piston and said milking unit and having a passage longitudinally therethrough, an exhaust port for the milking unit in said cylinder normally open, adapted to be closed by the movement of said secondary piston toward said unit, yieldable means opposing the travel of said primary piston in the direction of said unit, yieldable means for opposing the travel of said secondary piston in the same direction, an abutment upon said secondary piston, a spring arm having one extremity mounted on a fixed part of the device and having mounted upon its free extremity yieldable angularly disposed arms adapted to tilt about said free end and normally tending to cling to the interior of said cylinder wall, one of said tilting arms being adapted to engage said abutment and hold the secondary cylinder in fixed position to cover the exhaust port so long as the other of said tilting arms bears against the wall of said primary piston.

CHAMPION H. JUDSON.

Witnesses:
GERALD E. TERWILLIGER,
KARL S. DEITZ.

---

Copies of this patent may be obtained for five cents each, by addressing the "Commissioner of Patents, Washington, D. C."